US008671172B2

(12) United States Patent  
Christenson et al.

(10) Patent No.: US 8,671,172 B2
(45) Date of Patent: Mar. 11, 2014

(54) NETWORK DEVICE CONFIGURATION

(75) Inventors: David A. Christenson, Fergus Falls, MN (US); Christopher T. Gloe, Rochester, MN (US); Brian E. Jongekryg, Rochester, MN (US); John C. Kasperski, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 851 days.

(21) Appl. No.: 12/499,882

(22) Filed: Jul. 9, 2009

(65) Prior Publication Data

US 2011/0010437 A1  Jan. 13, 2011

(51) Int. Cl.
G06F 15/177 (2006.01)

(52) U.S. Cl.
USPC .......................................... 709/222; 709/223

(58) Field of Classification Search
USPC ....................................................... 709/222
See application file for complete search history.

(56) References Cited

U.S. PATENT DOCUMENTS

| | | | |
|---|---|---|---|
| 5,247,626 A | 9/1993 | Firoozmand | |
| 5,515,371 A | 5/1996 | Venters | |
| 5,758,166 A | 5/1998 | Ajanovic | |
| 6,289,378 B1 * | 9/2001 | Meyer et al. | 709/223 |
| 6,345,294 B1 | 2/2002 | O'Toole et al. | |
| 6,381,650 B1 * | 4/2002 | Peacock | 709/245 |
| 6,490,630 B1 | 12/2002 | Poon et al. | |
| 6,629,145 B1 | 9/2003 | Pham et al. | |
| 6,687,817 B1 | 2/2004 | Paul | |
| 6,912,602 B2 | 6/2005 | Sano et al. | |
| 6,978,294 B1 * | 12/2005 | Adams et al. | 709/217 |
| 7,568,018 B1 * | 7/2009 | Hove et al. | 709/221 |
| 7,793,074 B1 | 9/2010 | Wentzlaff et al. | |
| 8,112,559 B2 | 2/2012 | Blocksome et al. | |
| 2003/0212773 A1 * | 11/2003 | Sullivan | 709/221 |
| 2003/0233576 A1 * | 12/2003 | Maufer et al. | 713/201 |
| 2004/0030762 A1 * | 2/2004 | Silverthorne et al. | 709/223 |
| 2004/0249907 A1 * | 12/2004 | Brubacher et al. | 709/220 |
| 2005/0138179 A1 * | 6/2005 | Encarnacion et al. | 709/227 |
| 2005/0251577 A1 * | 11/2005 | Guo et al. | 709/230 |
| 2005/0289254 A1 | 12/2005 | Chien | |
| 2006/0059003 A1 * | 3/2006 | Requena et al. | 705/1 |
| 2006/0232819 A1 * | 10/2006 | Kasamatsu | 358/1.15 |
| 2007/0073960 A1 | 3/2007 | Ogawa et al. | |
| 2007/0118742 A1 | 5/2007 | Abhishek et al. | |
| 2007/0204156 A1 * | 8/2007 | Jeghers | 713/168 |
| 2007/0286100 A1 * | 12/2007 | Saaranen et al. | 370/260 |
| 2009/0100155 A1 * | 4/2009 | Lee | 709/220 |
| 2011/0087721 A1 | 4/2011 | Huang et al. | |
| 2011/0173287 A1 | 7/2011 | Blocksome et al. | |

OTHER PUBLICATIONS

"UPnP Device Architecture 1.1". UPnP Forum. Oct. 15, 2008. pp. 1-129.*

* cited by examiner

Primary Examiner — Christopher Biagini
(74) Attorney, Agent, or Firm — Chad J. Hammerlind; James R. Nock

(57) ABSTRACT

Systems, methods and articles of manufacture are disclosed for configuring a network device on a private network. A network device broadcasts a status message to the private network. The network device receives a request from a client and sends a response. The network device and the client establish a direct message route wherein one or more network configuration settings are exchanged between the client computer and the network device.

17 Claims, 10 Drawing Sheets

NETWORK DEVICE CONFIGURATION

BACKGROUND OF THE INVENTION

1. Field of the Invention

The field of invention relates to networking. In particular, the field of invention relates to autonomous network device configuration.

2. Description of the Related Art

Network configuration and maintenance has long been a complex process. Indeed, for many small and medium sized businesses, the complexity associated with network administration has resulted in significant costs. As a result, businesses are pushing for simplified network set-up and maintenance.

Current techniques minimize the need for user involvement by automatically configuring network devices. However, proposed techniques are limited because such techniques require Internet connectivity or alternatively require that all new network devices be connected to the same LAN segment. Further, current techniques fail to make use of configuration information on client devices on the network to build configuration defaults on the new network device. As a result, current solutions for simplifying network set-up and maintenance are inadequate.

SUMMARY OF THE INVENTION

One embodiment of the invention includes a computer implemented method for configuring a network device on a private network. The operation may generally include broadcasting a self-identifying status message to the private network; receiving from a client computer, in response to the self-identifying status message, an open path request packet; responding to the received open path request with an open path response packet and establishing a direct message route with the client computer; and receiving, via the direct message route, one or more network configuration settings from the client computer.

Another embodiment of the invention includes a computer readable storage medium containing a program, which when executed performs an operation for configuring a network device on a private network. The operation may generally include broadcasting a self-identifying status message to the private network; receiving from a client computer, in response to the self-identifying status message, an open path request packet; responding to the received open path request with an open path response packet and establishing a direct message route with the client computer; and receiving, via the direct message route, one or more network configuration settings from the client computer.

Still another embodiment of the invention includes having a processor and a memory containing a program, which when executed by the processor is configured to perform an operation for configuring a network device on a private network. The operation may generally include broadcasting a self-identifying status message to the private network; receiving from a client computer, in response to the self-identifying status message, an open path request packet; responding to the received open path request with an open path response packet and establishing a direct message route with the client computer; and receiving, via the direct message route, one or more network configuration settings from the client computer.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF THE PREFERRED EMBODIMENTS

Figure 1:
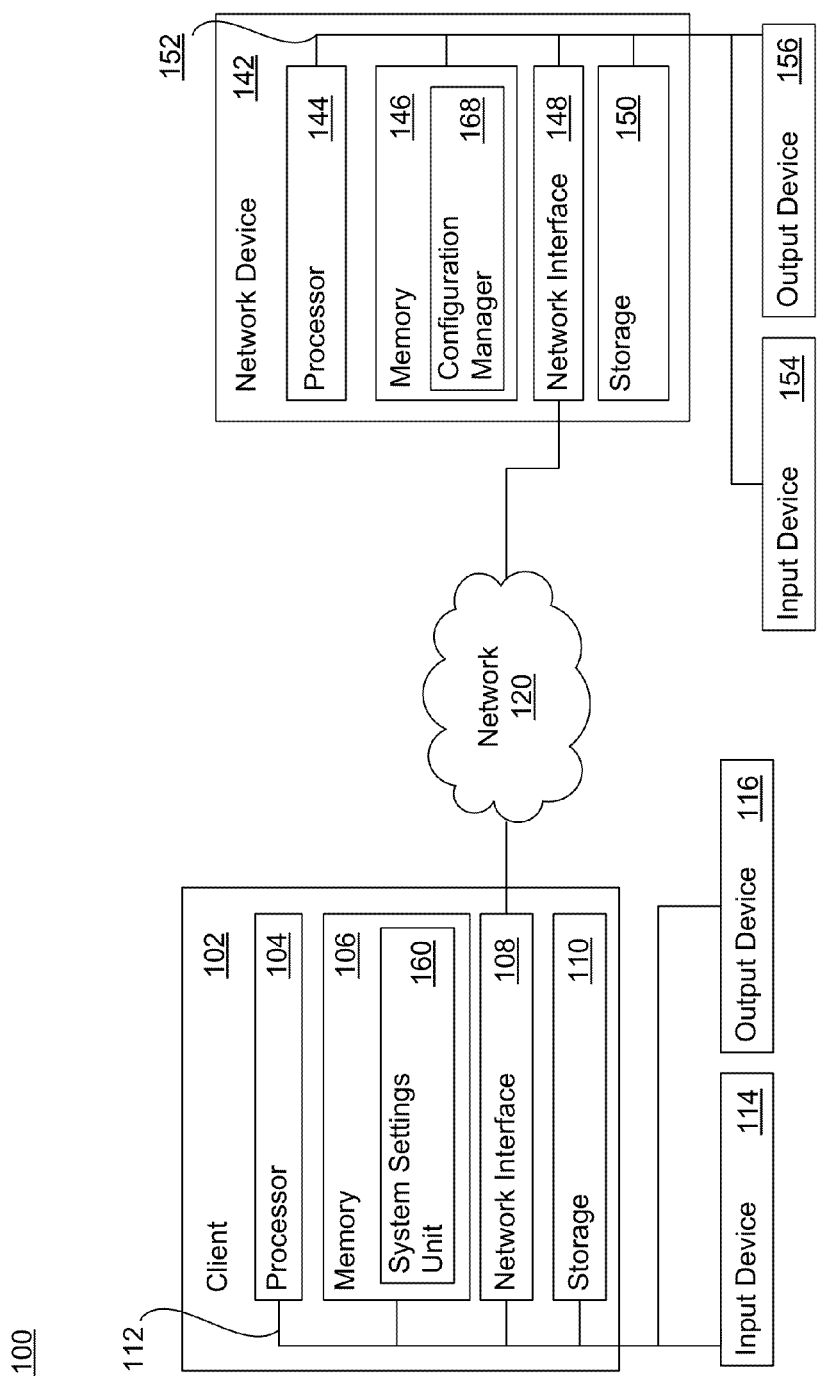
FIG. 1 is a block diagram illustrating a system for autonomously configuring a network device, according to one embodiment of the invention.

FIG. 1 is a block diagram illustrating an embodiment of a system 100 for autonomously configuring a networked device. The networked system 100 includes a client computer 102 (client) and a networked device 142, wherein the networked device may be a server, for example. The client 102 and the networked device 142 are connected via a network 120. In a particular embodiment, the network 120 is a private network with a distributed DNS server configuration.

The client 102 generally includes a processor 104 connected via a bus 112 to a memory 106, a network interface device 108, a storage 110, an input device 114, and an output device 116. The client 102 is generally under the control of an operating system. Examples of operating systems include UNIX, versions of the Microsoft Windows® operating system, and distributions of the Linux® operating system. (Note: Linux is at trademark of Linus Torvalds in the United States and other countries.) More generally, any operating system supporting the functions disclosed herein may be used.

The memory 106 may be a random access memory. While the memory 106 is shown as a single entity, it should be understood that the memory 106 may in fact comprise a plurality of modules, and that the memory 106 may exist at multiple levels, from high speed registers and caches to lower speed but larger DRAM chips.

As shown, the memory 106 includes a systems settings unit 160, configured to store system settings including time settings, proxy settings, and language values, for example. In an alternative embodiment, the system settings unit 160 is stored in storage.

The storage 110 may be a hard disk drive storage device. Although the storage 110 is shown as a single unit, the storage 110 may be a combination of fixed and/or removable storage devices, such as fixed disc drives, floppy disc drives, tape drives, removable memory cards, or optical storage. The memory 106 and the storage 110 may be part of one virtual address space spanning multiple primary and secondary storage devices.

The input device 114 may be any device for providing input to the client 102. For example, a keyboard, keypad, light pen, touch-screen, track-ball, or speech recognition unit, audio/video player, and the like may be used.

The output device 116 may be any device for providing output to a user of the client 102. For example, the output device 116 may be any conventional display screen or set of speakers, along with their respective interface cards, i.e., video cards and sound cards.

The networked device 142 generally includes a processor 144 connected via a bus 152 to a memory 146, a network interface device 148, a storage 150, an input device 154, and an output device 156. The processor 144 could be any hardware processor used to perform an embodiment of the invention.

Like the memory 106, the memory 146 may be a random access memory sufficiently large to hold the necessary programming and data structures of the invention. The programming and data structures may be accessed and executed by the processor 144 as needed during operation. While the memory 146 is shown as a single entity, it should be understood that the memory 146 may in fact comprise a plurality of modules, and that the memory 146 may exist at multiple levels, from high speed registers and caches to lower speed but larger DRAM chips.

Figure 2:
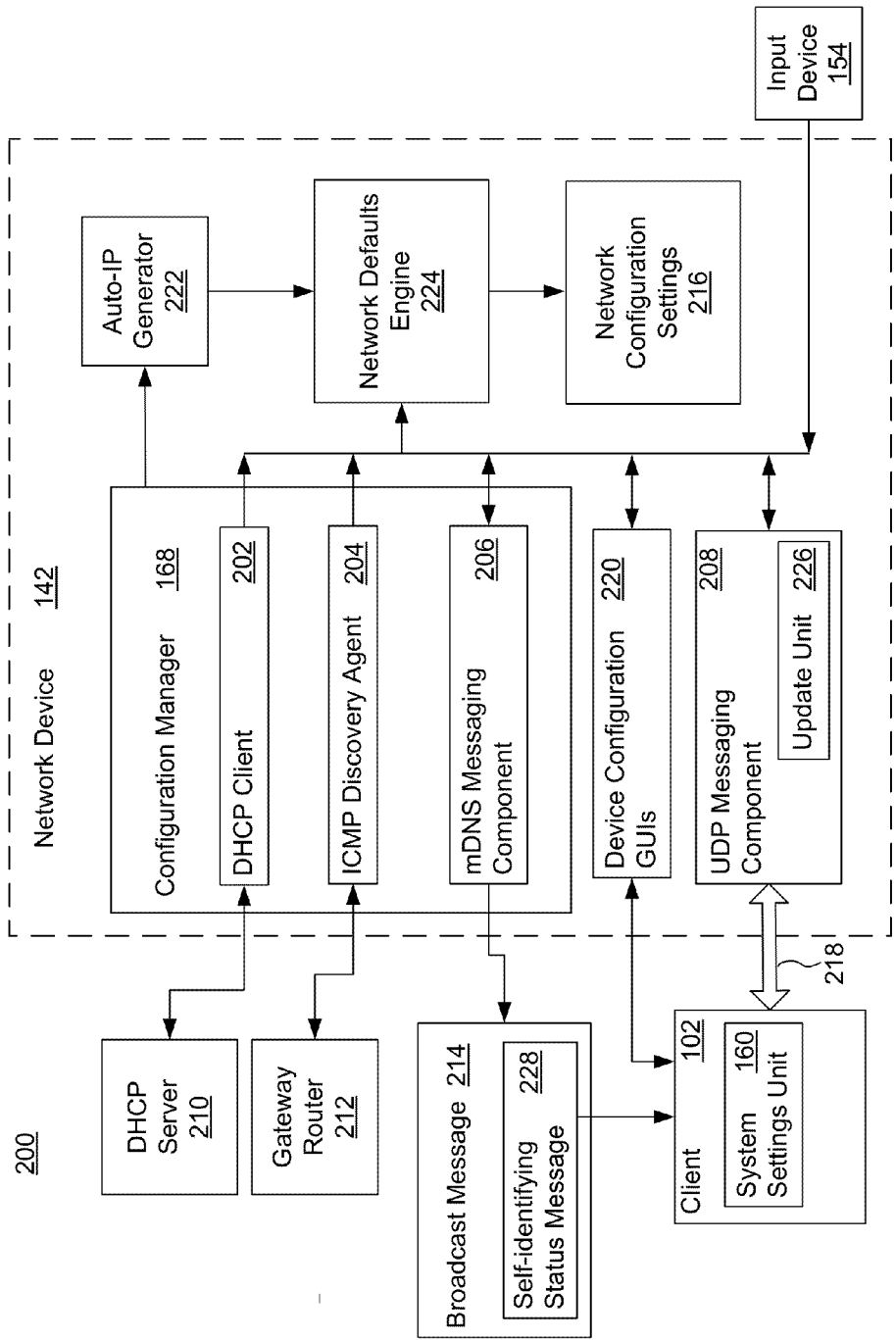
FIG. 2 is a detailed description of the configuration manager of FIG. 1, according to one embodiment of the invention.

As shown, the memory 146 includes a configuration manager 168, configured to handle network device configuration as detailed further in FIG. 2.

Like the network interface device 108, the network interface device 148 may be any entry/exit device configured to allow network communications between the client 102 and the networked device 142 via the network 120. For example, the network interface device 148 may be a network adapter or other network interface card (NIC).

Like the storage 110, the storage 150 may be a hard disk storage device. Although the storage 150 is shown as a single unit, the storage 150 may be a combination of fixed and/or removable storage devices, such as fixed disc drives, floppy disc drives, tape drives, removable memory cards, or optical storage. The memory 146 and the storage 150 may be part of one virtual address space spanning multiple primary and secondary storage devices.

Like the input device 114, the input device 154 may be any device for providing input to the client 102. For example, a keyboard, keypad, light pen, touch-screen, track-ball, or speech recognition unit, audio/video player, and the like may be used.

Like the output device 116, the output device 156 may be any device for providing output to a user of the networked device 142. For example, the output device 156 may be any conventional display screen or set of speakers, along with their respective interface cards, i.e., video cards and sound cards.

Those skilled in the art will appreciate alternative configurations of a networked device, wherein, for example, the networked device only includes the processor, the memory and the network interface.

FIG. 2 is a detailed description of the configuration manager 168, according to one embodiment of the invention. As shown the configuration manager 168 includes a Dynamic Hosts Configuration Protocol (DHCP) client 202, an Internet Control Message Protocol (ICMP) discovery agent 204, and a multicast DNS (mDNS) messaging component 206.

In one embodiment, the DHCP client 202 is configured to execute when the networked device 142 is introduced onto the private network (FIG. 1, element 120). The DHCP client 202 is configured to gather information from the private network on which the networked device is deployed and output such information to a network defaults engine 224. In particular, the DHCP client 202 is configured to communicate with a DHCP server 210 and collect network specific information including an IP address for the networked device 142.

Alternatively, if no DHCP server 210 exists on the private network, the configuration manager 168 is configured to communicate with an auto-IP generator 222, wherein the auto-IP generator 222 is configured to generate a link-local IP address and output the link-local IP address to the network defaults engine 224. The auto-IP generator 222 may be configured to ping the newly generated link-local IP address to ensure that the link-local IP address is not in currently use. In yet another embodiment, the auto-IP generator 222 may be configured to query the internet to determine the most frequently used IP address ranges and generate a link-local IP address that falls out of the most frequently used IP address ranges.

In one embodiment, the ICMP discovery agent 204 is configured to use ICMP router discovery to locate a gateway router 212 on the network to discover the addresses of operating routers on the subnet. The ICMP discovery agent 204 is configured to output the addresses of the operating routers to the network defaults engine 224.

In one embodiment, the multicast DNS (mDNS) messaging component 206 is configured to use mDNS, or a similar broadcast technology, to send a broadcast message 214 to the private network, wherein the broadcast message 214 includes a self-identifying status message 228. The self-identifying status message 228 may include an associated network device serial number, hostname, user datagram protocol (UDP), listening port number, and the IP address as determined by the DHCP server 210, or alternatively by the auto-IP generator 222.

The client 102 is configured to receive the broadcast message and to add a direct message route 218 to the UDP messaging component 208 using UDP. UDP is a message based connectionless protocol, wherein a connectionless protocol does not set up a dedicated end-to-end connection and wherein communication is achieved by transmitting information in one direction from source to receiver without verifying the readiness or state of the receiver. UDP allows the client to send messages to network devices on the private network without requiring prior communications to set up special transmission channels or data paths. Additional detail is provided in FIG. 4 and FIG. 6 and the associated descriptions. The direct message route 218 may be used to exchange IP data packets including network configuration information and local settings stored in the system settings unit 160 of the client 102. The client 102 and networked device 142 are further configured to maintain ongoing communication.

In an alternative embodiment, the client 102 and the networked device 142 are configured to establish a TCP connection after the direct message route 218 is established, wherein the TCP connection is an HTTPS connection and wherein the TCP connection handles secure communications of the network configuration settings. The network configuration information obtained by the UDP messaging component 208 from the client 102 is output to the network defaults engine 224.

As shown, the UPD messaging component 208 includes an update unit 226. The update unit 226 automatically updates the direct message route 218 between the client 102 and the networked device 142 if the subnet or the IP address of the networked device is changed. For example, if an administrator updates the networked device via the input device 154, the update unit 226 captures the change and propagates the updated subnet and/or IP address to the client via the direct message route 218, thus maintaining connectivity between the client and the networked device without interruption.

The network defaults engine 224 is configured to establish defaults for the network configuration settings 216 based on received inputs from the configuration manager 168, the auto-IP generator 222 (if required), and the client 102 via the UDP messaging component 208. Examples of the defaults (hereinafter "pre-determined defaults") established by the network defaults engine 224 include the IP address, the subnet mask, the gateway router, a list of DNS servers, various proxy settings, time zone settings, and language values among other things.

In one embodiment, the network defaults engine 224 is configured to first recommend the pre-determined defaults to an administrator via device configuration GUIs 220 before modifying the network configuration settings 216 on the networked device 142. In particular, the network defaults engine 224 takes input from the device configuration GUIs 220 based on a set of questions. The device configuration GUIs 220 are configured to display questions and receive input to better determine the appropriate network configuration settings 216. For example, one question may include, "We noticed that there is no DHCP server on your network. Would you like the new device to be a DHCP server?" The network defaults engine 224 is configured to take input from the device configuration GUIs 220 and update the network configuration settings 215 based both on the pre-determined defaults and administrator responses to questions in the device configuration GUI 220.

Figure 3A:
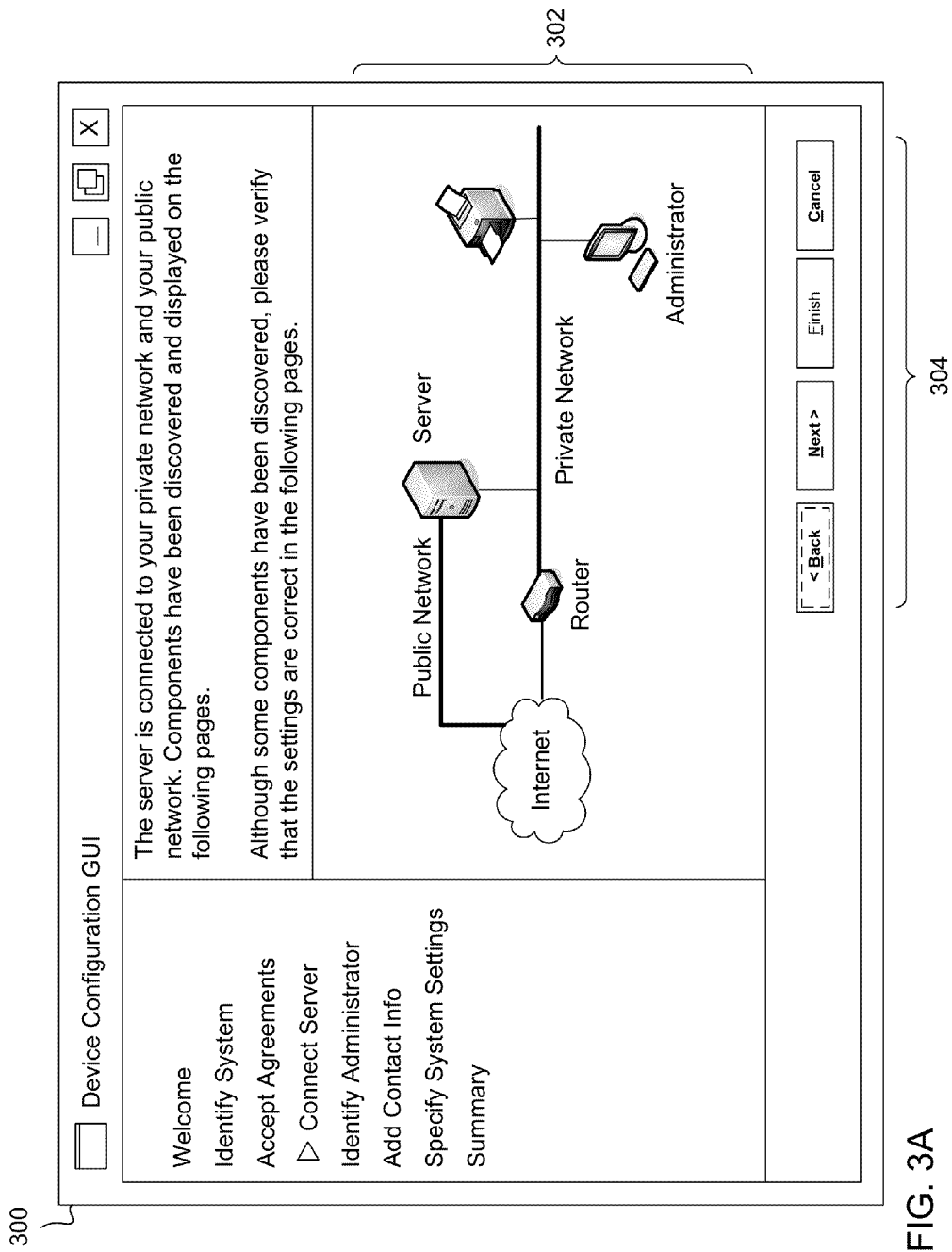
FIGS. 3A-3E illustrate the device configuration GUIs of FIG. 2, according to one embodiment of the invention.

FIGS. 3A-3E illustrate the device configuration GUIs of FIG. 2, according to one embodiment of the invention. FIG. 3A illustrates a GUI 300 that includes a network illustration pane 302 and command buttons 304. The network illustration pane 302 displays to a user connectivity to a private network and a public network. As shown, the server is connected to the public network and the private network. It should be noted that the public network will not appear in the network illustration pane 302 if the Ethernet adapter is not connected to the public network. The command buttons 304 allow a user to navigate to a next step in device configuration (e.g., by clicking on the "Next" button), navigate to a previous step in device configuration (e.g., by clicking on the "Back" button), or cancel device configuration (e.g., by clicking on the "Cancel" button).

Figure 3B:
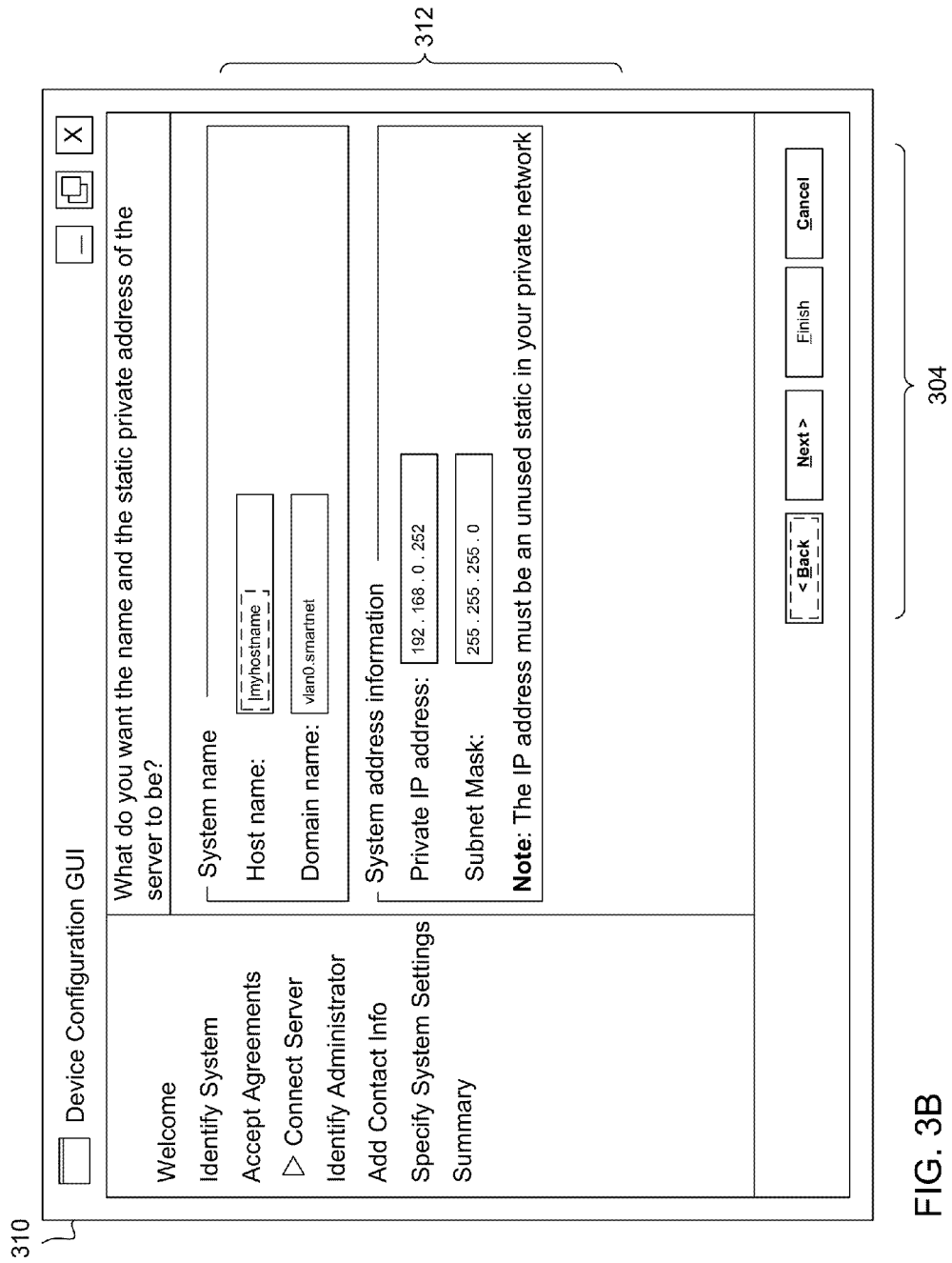

FIG. 3B illustrates a GUI 310 that includes an IP address configuration pane 312 and command buttons 304. For example, GUI 310 may be displayed when a user clicks on the "Next" button of GUI 300 in FIG. 3A. The IP address configuration pane 312 allows a user to review the system name and static private IP address of the server and/or, if necessary, allows a user to modify the system name and the static private IP address. In one embodiment, the system name and the system address input fields will restrict users from entering system names and static private IP addresses that are already in use. For example, the "Next" command button may be disabled if an entered system name or an entered static private IP address is already in use. As shown, the "private IP address" input field in the IP address configuration pane 312 is pre-filled by the network defaults engine 224 of FIG. 2 with an IP address value generated by a DHCP server on the private network or, alternatively, generated by the auto-IP generator 222 of FIG. 2.

Figure 3C:
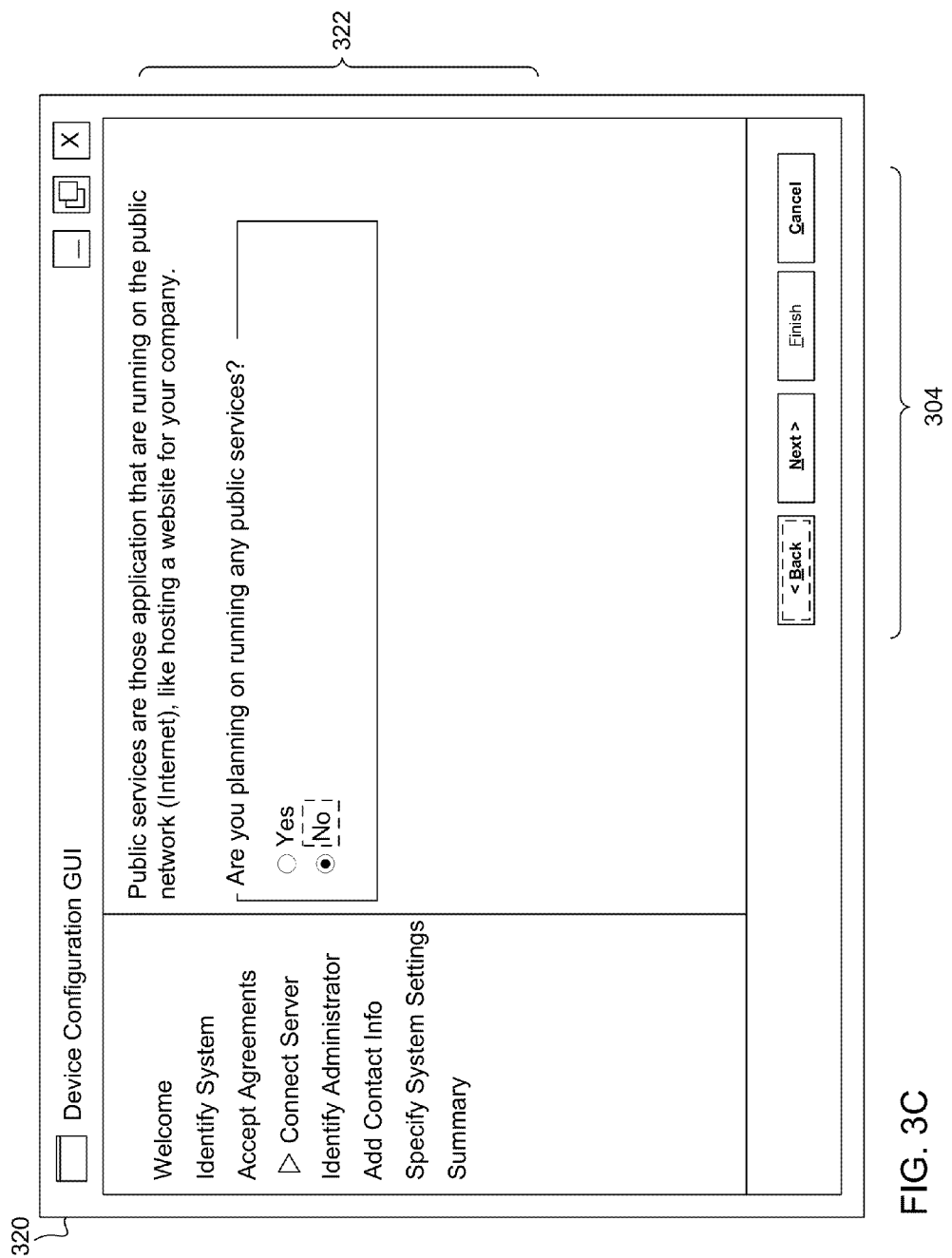

FIG. 3C illustrates a GUI 320 that includes a public services configuration pane 322 and command buttons 304. For example, GUI 320 may be displayed when a user clicks on the "Next" button of GUI 310 in FIG. 3B. The public services configuration pane 322 allows a user to select to run a public service from the server. For example, the user would select "Yes" if the user planned on hosting a public website on the server. It should be noted that the public services configuration pane 322 will not appear in the network illustration pane 302 if the Ethernet adapter is not connected to the public network.

Figure 3D:
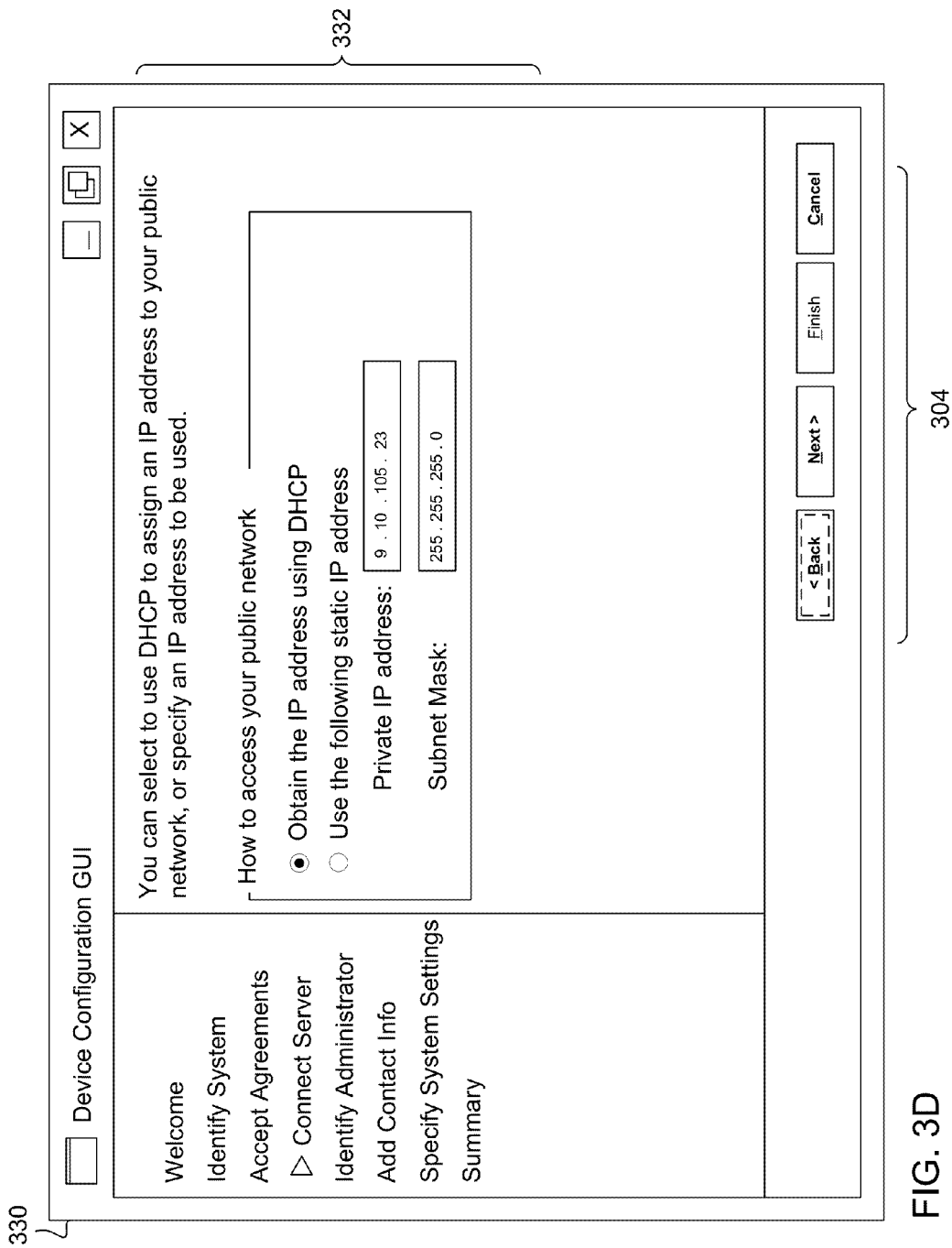

FIG. 3D illustrates a GUI 330 that includes a public network address configuration pane 332 and command buttons 304. For example, GUI 330 may be displayed when a user clicks on the "Next" button of GUI 320 in FIG. 3C and the user selects not to run a public server. As shown, a user may select to automatically assign a public network IP address using DHCP or, alternatively, may manually specify the IP address to be used.

Figure 3E:
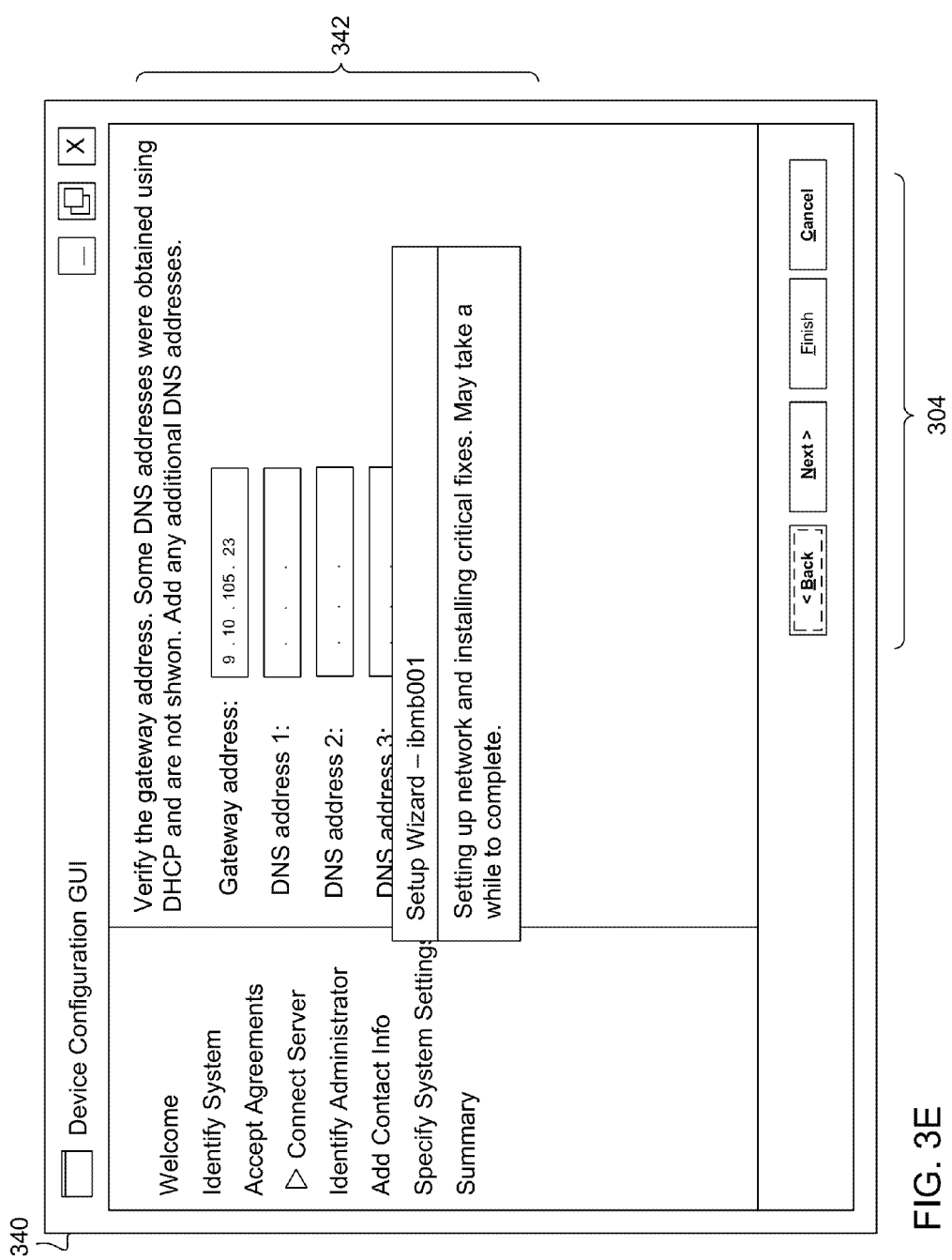

FIG. 3E illustrates a GUI 340 that includes a gateway address configuration pane 342 and command buttons 304. For example, GUI 340 may be displayed when a user clicks on the "Next" button of GUI 330 in FIG. 3D. The gateway address configuration pane 342 allows a user to review the gateway address and the DNS server addresses of the server and/or, if necessary, allows a user to modify the system name and the static private IP address. As shown, the "gateway address" input field may be pre-filled by the network defaults engine 224 of FIG. 2 with a gateway address identified by the ICMP discovery agent 204 of FIG. 2. The DNS address input fields may also be pre-filled, similar to the gateway address with network settings collected by the network defaults engine 224 of FIG. 2. In one embodiment, clicking the "Next" button may initiate the network setup wizard as shown in FIG. 3E.

Figure 4:
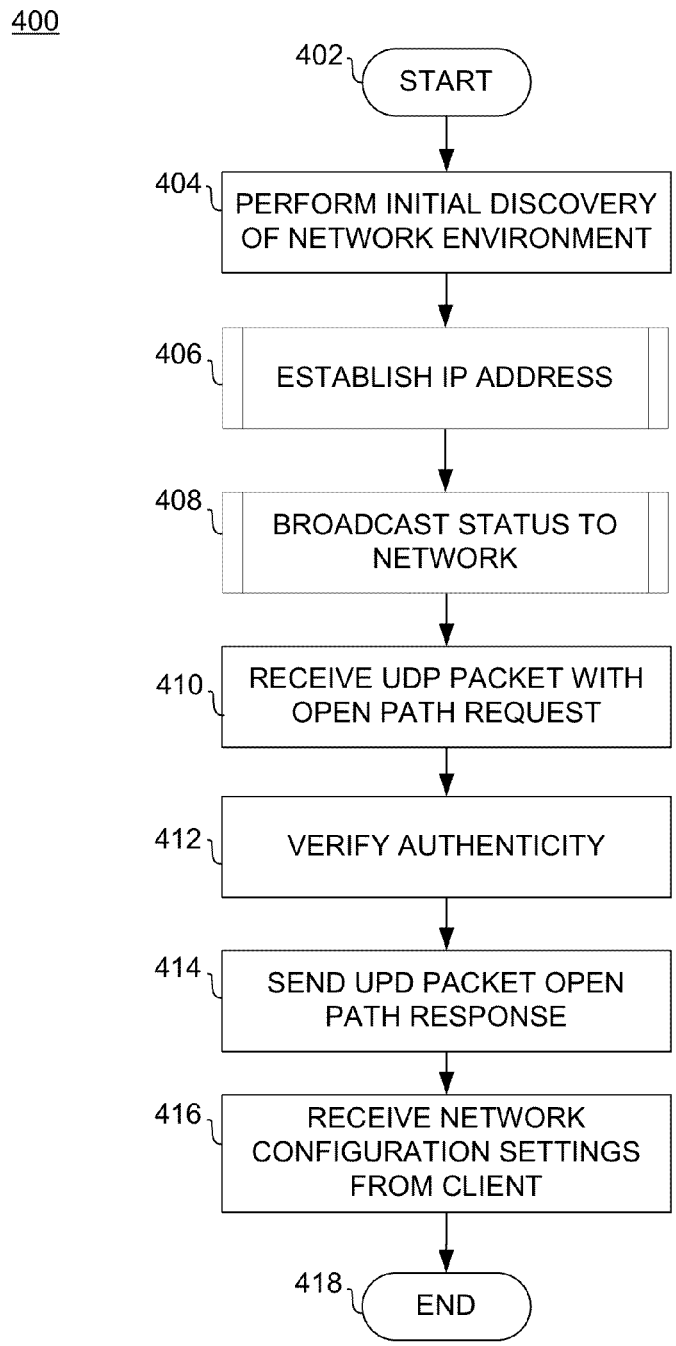
FIG. 4 is a flowchart illustrating a process for configuring an unconfigured network device introduced onto a network, according to one embodiment of the invention.

FIG. 4 is a flowchart illustrating an embodiment of a process 400 for configuring an unconfigured networked device (network device) introduced onto a private network.

As shown, the process starts at block 402. At block 404, the network device performs an initial discovery of the network and, at block 406, establishes an IP address. Blocks 406 and 408 are described in further detail in FIG. 5. At block 408, the network device broadcasts a self-identifying status message 228 to the network and, at block 410, the network device receives a UDP packet, wherein the UDP packet includes an open path request as detailed further in FIG. 6.

At block 412, the network device verifies authenticity. In one embodiment, the network device verifies authenticity by comparing a received private network key sent from the client with a stored private network key, wherein the private network key is unique to the private network shared by the client and the network device. In an alternative embodiment, the network device may also encrypt ongoing communication with an encryption algorithm that uses the private network key for encryption and decryption. At block 414, the network device sends an open path response in the form of a UDP packet. At block 418, the network device receives configuration settings from a client on the network. At block 420, the process ends.

Figure 5:
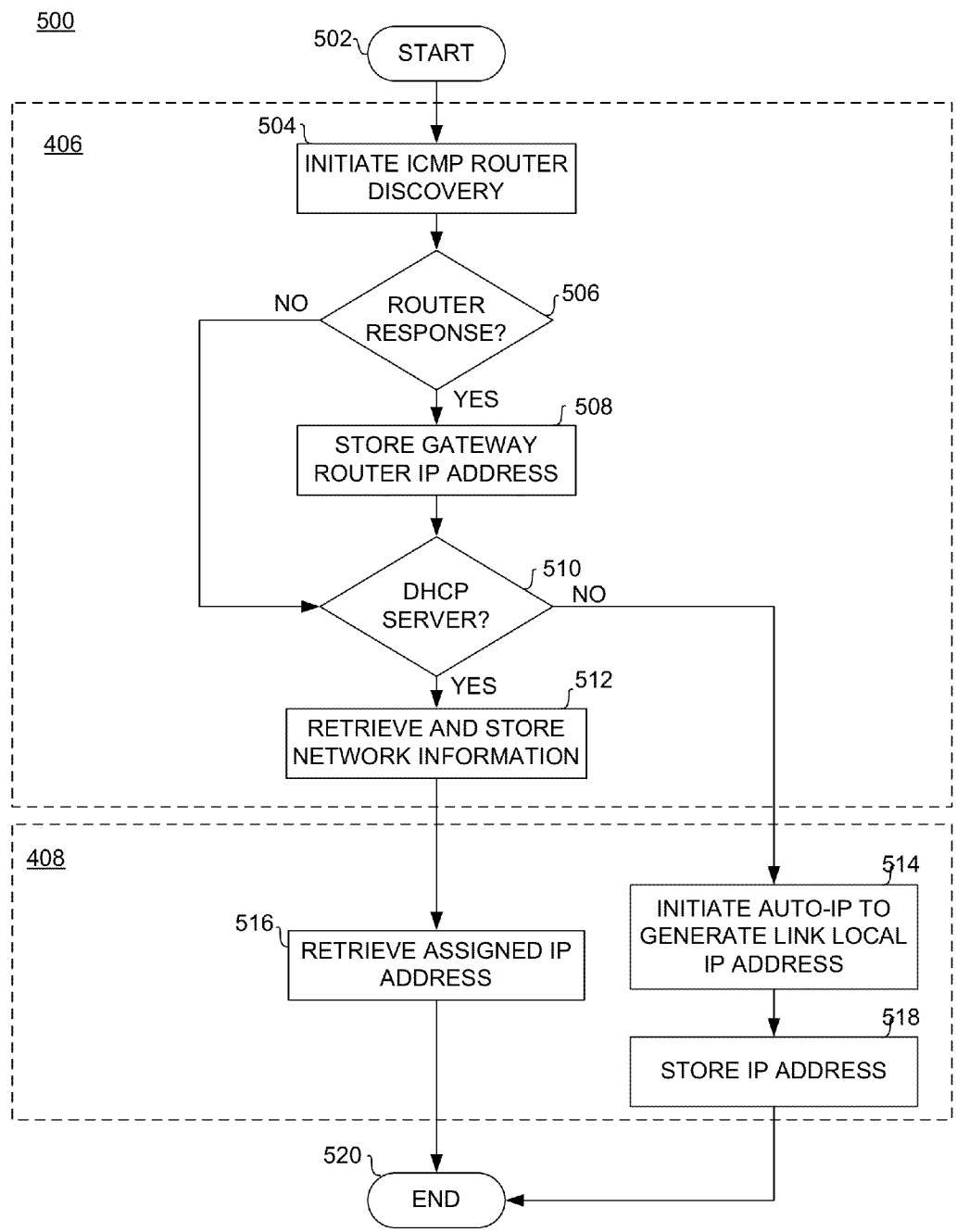
FIG. 5 is a flowchart illustrating the initial discovery process and IP address generation process of FIG. 4, according to one embodiment of the invention.

FIG. 5 is a flowchart that provides additional detail on one embodiment of the initial discovery process and IP address generation process, blocks 406 and 408 respectively, of FIG. 2.

As shown the process starts at block 502. At block 504, the network device initiates ICMP router discovery and control passes to block 506 to determine if there is a router response. If YES, control passes to block 508 and the network device stores network information, including the gateway router IP address. After block 508, control passes to block 510. If NO, control passes directly to block 510 and the network device determines whether a DHCP server exists on the network. If YES, the network device receives and stores network information, at block 512, wherein the network information includes an assigned IP address. At block 516, the network device stores the assigned IP address and control passes to block 520, the end of process 500. If NO, the network device initiates auto-IP to generate a link-local IP address, at block 514, and control passes to block 518 and the network device stores the IP address. After block 518, control passes to block 520, the end of process 500.

Figure 6:
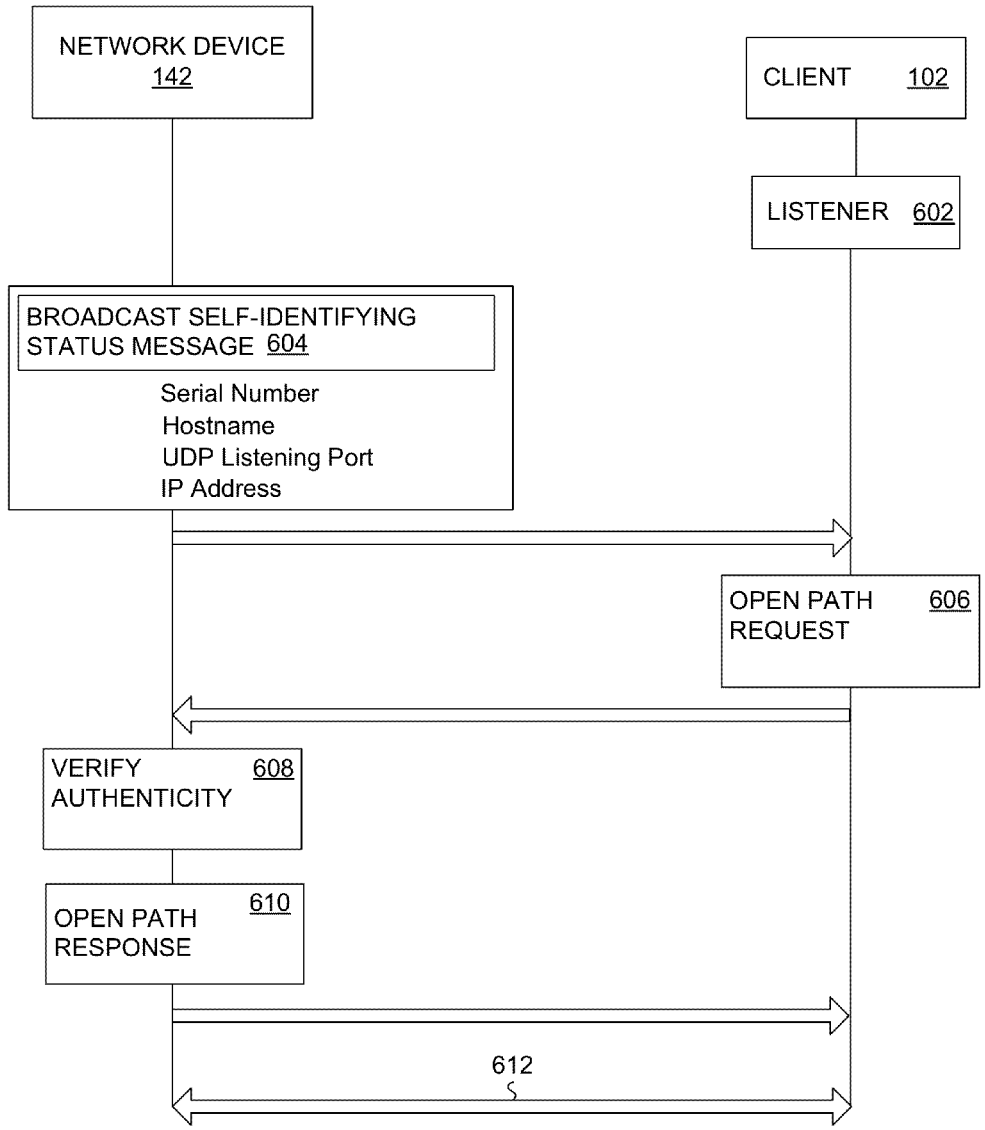
FIG. 6 is a block diagram illustrating in further detail the communication between the networked device and the client on the network, according to one embodiment of the invention.

FIG. 6 is a block diagram illustrating in further detail one embodiment of the communication between the network device and the client on the private network.

The client 102 is configured to listen on the network for mDNS broadcast messages 602. The network device 142 is configured to broadcast self-identifying status messages onto the network 604, wherein the self-identifying status message includes network device serial number, hostname, UDP listening port, and IP address, for example, as previously described in FIG. 2 (hereinafter "the broadcast").

The client 102 is further configured to receive the broadcast and is configured to define how data packets are routed to the network device 142 associated with the received broadcast. In particular, the client 102 is configured to identify data packets destined for the IP address associated with the network device 142 and is configured to route the data packets using UDP via the direct message route 218 of FIG. 2. The client 102 is further configured to send a unicast UDP packet to the network device, wherein the UDP packet includes an open path request 606, wherein the open path request includes information identifying the client (hereinafter "client identifier").

The network device 142 is configured receive the open path request 606, including the client identifier, and is configured to verify authenticity 608 as described in FIG. 4. The network device is further configured to identify data packets destined for the IP address associated with the client 102 and is configured to route the data packets using UDP via the direct message route 218 of FIG. 2. The network device is further configured to send an open path response 610 to the client in the form of a UDP packet, wherein the open path response 610 acknowledges the client 102 and receipt of the open path request 606. A direct connection 612 between the client and the network device is established, eliminating any additional broadcast or multicast network traffic.

As detailed in FIG. 2 and the accompanying descriptions, a further aspect of the embodiment described herein is that the client and the network device are configured to automatically update the direct message route, thus allowing communication to continue without disruption if the IP address associated with the network device or the subnet is changed.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In the aforementioned, reference is made to private network servers, including distributed DNS servers on the private network. Those skilled in the art will appreciate that the private network servers described in the embodiments herein may serve multiple purposes, wherein no server is exclusively dedicated to managing domain names or hosting applications. At the very least, the private network servers described herein may function both as an application server and as a DNS server. In addition, reference is made to local subnet. It should be understood that the term local subnet is used interchangeably with the term LAN segment to mean that portion of a local area network wherein every device communicates using the same physical layer.

Further, repeated reference is made to the private network. Those skilled in the art will appreciate that the network devices in the private network may communicate with network devices outside of the private network. Further, those skilled in the art will appreciate that aspects of the embodiments of the invention described herein may transcend the private network and work equally well in a WAN.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer implemented method for configuring a network device on a private network, comprising configuring one or more processors to perform an operation, comprising:
    broadcasting a self-identifying status message to the private network;
    receiving from a client computer, in response to the self-identifying status message, an open path request to establish a direct message route including a private network key;
    verifying authenticity of the open path request by comparing the received private network key with a stored private network key;
    if the authenticity of the open path request is verified:
        responding to the received open path request with a open path response and establishing the direct message route with the client computer for obtaining at least one or more network configuration settings, and
        receiving, via the direct message route, the one or more network configuration settings from the client computer; and
    automatically updating the direct message route via the direct message route and maintaining connectivity without interruption, between the network device and client computer if an IP address or a subnet is changed.

2. The computer implemented method of claim 1, further comprising receiving one or more network configuration settings from a DHCP server.

3. The computer implemented method of claim 2, further comprising receiving one or more network configuration settings from a gateway router.

4. The computer implemented method of claim 1, wherein the network configuration settings include a client IP address, a subnet mask, a gateway router IP address, a list of DNS servers, a set of proxy settings, a current time zone, and a language value.

5. The computer implemented method of claim 1, wherein the self-identifying status message includes a network device serial number, a hostname, a UDP listening port, and the IP address.

6. The computer implemented method of claim 5, wherein the IP address is received from a DHCP server on the private network.

7. The computer implemented method of claim 5, wherein the IP address is automatically generated if a DHCP server is not available on the private network.

8. The computer implemented method of claim 1, wherein the open path request and the open path response are in the form of a UDP packet.

9. A computer readable storage device containing a program, which when executed performs an operation for configuring a network device on a private network, comprising:
    broadcasting a self-identifying status message to the private network;
    receiving from a client computer, in response to the self-identifying status message, an open path request to establish a direct message route including a private network key;
    verifying authenticity of the open path request by comparing the received private network key with a stored private network key;
    if the authenticity of the open path request is verified:
        responding to the received open path request with a open path response and establishing the direct message route with the client computer for obtaining at least one or more network configuration settings, and
        receiving, via the direct message route, the one or more network configuration settings from the client computer; and
    automatically updating the direct message route via the direct message route and maintaining connectivity without interruption, between the network device and client computer if an IP address or a subnet is changed.

10. The computer readable storage device of claim 9, further comprising receiving one or more network configuration settings from a gateway router.

11. The computer readable storage device of claim 10, further comprising receiving one or more network configuration settings from a DHCP server.

12. The computer readable storage device of claim 9, wherein the self-identifying status message includes a network device serial number, a hostname, a UDP listening port, and the IP address.

13. The computer readable storage device of claim 12, wherein the IP address is received from a DHCP server on the private network.

14. The computer readable storage device of claim 12, wherein the IP address is automatically generated if a DHCP server is not available on the private network.

15. The computer readable storage device of claim 9, wherein the network configuration settings include a client IP address, a subnet mask, a gateway router IP address, a list of DNS servers, a set of proxy settings, a current time zone, and a language value.

16. The computer readable storage device of claim 9, wherein the open path request and the open path response are in the form of a UDP packet.

17. A system, comprising:
a processor; and
a memory containing a program, which when executed by the processor is configured to perform an operation for configuring a network device on a private network, comprising:
broadcasting a self-identifying status message to the private network;
receiving from a client computer, in response to the self-identifying status message, an open path request to establish a direct message route including a private network key;
verifying authenticity of the open path request by comparing the received private network key with a stored private network key;
if the authenticity of the open path request is verified:
responding to the received open path request with a open path response and establishing the direct message route with the client computer for obtaining at least one or more network configuration settings, and
receiving, via the direct message route, the one or more network configuration settings from the client computer; and
automatically updating the direct message route via the direct message route and maintaining connectivity without interruption, between the network device and client computer if an IP address or a subnet is changed.

* * * * *